United States Patent
Lee et al.

(10) Patent No.: US 8,221,917 B2
(45) Date of Patent: Jul. 17, 2012

(54) POSITIVE ACTIVE MATERIAL COMPOSITION FOR RECHARGEABLE BATTERY, ELECTRODE INCLUDING THE SAME, AND RECHARGEABLE BATTERY INCLUDING THE SAME

(75) Inventors: Dai-Hoe Lee, Suwon-si (KR); Takaya Saito, Suwon-si (KR); Hyun-Ki Jung, Suwon-si (KR); Min-Hee Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 341 days.

(21) Appl. No.: 12/591,057

(22) Filed: Nov. 5, 2009

(65) Prior Publication Data
US 2010/0119943 A1    May 13, 2010

(30) Foreign Application Priority Data
Nov. 5, 2008    (KR) .................. 10-2008-0109447

(51) Int. Cl.
*H01M 4/52*    (2010.01)
*H01M 4/50*    (2010.01)
*H01M 4/48*    (2010.01)

(52) U.S. Cl. ............... 429/231.5; 429/221; 429/223; 429/224; 429/231.1; 429/231.3; 429/231.6; 252/182.1; 252/520.2

(58) Field of Classification Search ............... 429/231.5
See application file for complete search history.

(56) References Cited

U.S. PATENT DOCUMENTS

| | | | |
|---|---|---|---|
| 2005/0079419 A1* | 4/2005 | Jan et al. | 429/231.95 |
| 2008/0044727 A1* | 2/2008 | Suzuki et al. | 429/218.1 |
| 2009/0200509 A1* | 8/2009 | Suzuki et al. | 252/182.1 |

OTHER PUBLICATIONS

Fan, et al.; Effects of the nanostructured $SiO_2$ coating on the performance of $LiNi_{0.5}Mn_{1.5}O_4$ cathode materials for high-voltage Li-ion batteries; Electrochemica Acta, 2007, pp. 3870-3875; vol. 52, Issue 11; Elsevier Ltd.

* cited by examiner

*Primary Examiner* — John S Maples
(74) *Attorney, Agent, or Firm* — Lee & Morse, P.C.

(57) ABSTRACT

A positive active material composition for a rechargeable battery, a positive electrode including the same, and a rechargeable battery including the same, the positive active material composition including a positive active material and a surface-modified metal oxide.

17 Claims, 5 Drawing Sheets

(a)  (b)

POSITIVE ACTIVE MATERIAL COMPOSITION FOR RECHARGEABLE BATTERY, ELECTRODE INCLUDING THE SAME, AND RECHARGEABLE BATTERY INCLUDING THE SAME

This application claims priority from Korean Application No. 10-2008-0109447, filed 5 Nov. 2008.

BACKGROUND OF THE INVENTION

1. Field of the Invention

Embodiments relate to a positive active material composition for a rechargeable battery, a positive electrode fabricated using the same, and a rechargeable battery including the same.

2. Description of the Related Art

Rechargeable batteries, e.g., lithium rechargeable batteries, have recently drawn attention as a power source for small portable electronic devices. Rechargeable batteries may include an organic electrolyte solution, and thereby may have twice as high a discharge voltage as a conventional battery including an alkali aqueous solution. Rechargeable batteries accordingly may have high energy density.

Negative active materials of a rechargeable battery may include various carbon-based materials, e.g., artificial graphite, natural graphite, and hard carbon, which may all intercalate and deintercalate lithium ions.

Positive active materials of a typical rechargeable battery may include lithium oxides capable of intercalating lithium.

SUMMARY OF THE INVENTION

Embodiments are directed to a positive active material composition for a rechargeable battery, a positive electrode fabricated using the same, and a rechargeable battery including the same, which substantially overcome one or more of the problems associated with the related art.

It is therefore a feature of an embodiment to provide a rechargeable battery having excellent low temperature characteristics.

It is therefore another feature of an embodiment to provide a battery exhibiting low internal resistance at low temperatures.

At least one of the above and other features and/or advantages may be realized by providing a positive active material composition for a rechargeable battery including a positive active material and a surface-modified metal oxide.

The surface-modified metal oxide may include an $MR_x$ functional group at its surface, wherein M is Si, Ti, Zr, or Mg, R is a $C_1$-$C_3$ alkyl, and x is 1 to 4.

The surface-modified metal oxide may include, at a center region thereof, at least one of $SiO_2$, $ZrO_2$, $TiO_2$, and MgO.

The surface-modified metal oxide may include $Si(CH_3)_3$ at it surface and $SiO_2$ at the center region thereof.

The surface-modified metal oxide may be included in an amount of about 1 to about 10 wt % based on the weight of the positive active material.

The positive active material may include at least one compound represented by the following Formulae 1 to 25:

$$Li_aA_{1-b}X_bD_2 \qquad (1)$$

wherein $0.95 \leq a \leq 1.1$ and $0 \leq b \leq 0.5$ $$Li_aE_{1-b}X_bO_{2-c}M_c \qquad (2),$$

wherein $0.95 \leq a \leq 1.1$, $0 \leq b \leq 0.5$, and $0 \leq c \leq 0.05$ $$LiE_{2-b}X_bO_{4-c}M_c \qquad (3),$$

wherein $0 \leq b \leq 0.5$ and $0 \leq c \leq 0.05$ $$Li_aNi_{1-b-c}Co_bX_cD_\alpha \qquad (4),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Co_bX_cO_{2-\alpha}M_\alpha \qquad (5),$$

wherein $0.95 \leq a \leq 1.1$, $0 \leq b \leq 0.5$, $0 \leq c \leq 0.05$, and $0 < \alpha < 2$ $$Li_aNi_{1-b-c}Co_bX_cO_{2-\alpha}M_2 \qquad (6),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cD_\alpha \qquad (7),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Mn_bX_cO_{2-\alpha}M_\alpha \qquad (8),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cO_{2-\alpha}M_2 \qquad (9),$$

wherein $0.95 \leq a \leq 1.1$, $0 \leq b \leq 0.5$, $0 \leq c \leq 0.05$, and $0 < \alpha < 2$ $$Li_aNi_bE_cG_dO_2 \qquad (10),$$

wherein $0.90 \leq a \leq 1.1$, $0 \leq b \leq 0.9$, $0 \leq c \leq 0.5$, and $0.001 \leq d \leq 0.1$ $$Li_aNi_bCo_cMn_dG_eO_2 \qquad (11),$$

wherein $0.90 \leq a \leq 1.1$, $0 \leq b \leq 0.9$, $0 \leq c \leq 0.5$, $0 \leq d \leq 0.5$, and $0.001 \leq e \leq 0.1$ $$Li_aNiG_bO_2 \qquad (12),$$

wherein $0.90 \leq a \leq 1.1$ and $0.001 \leq b \leq 0.1$ $$Li_aCoG_bO_2 \qquad (13),$$

wherein $0.90 \leq a \leq 1.1$ and $0.001 \leq b \leq 0.1$ $$Li_aMnG_bO_2 \qquad (14),$$

wherein $0.90 \leq a \leq 1.1$ and $0.001 \leq b \leq 0.1$ $$Li_aMn_2G_bO_4 \qquad (15),$$

wherein $0.90 \leq a \leq 1.1$ and $0.001 \leq b \leq 0.1$ $$QO_2 \qquad (16),$$

$$QS_2 \qquad (17),$$

$$LiQS_2 \qquad (18),$$

$$V_2O_5 \qquad (19),$$

$$LiV_2O_5 \qquad (20),$$

$$LiZO_2 \qquad (21),$$

$$LiNiVO_4 \qquad (22),$$

$$Li_{(3-f)}J_2(PO_4)_3 \qquad (23),$$

wherein $0 \leq f \leq 2$ $$Li_{(3-f)}Fe_2(PO_4)_3 \qquad (24),$$

wherein $0 \leq f \leq 2$ $$LiFePO_4 \qquad (25)$$

wherein, in Formulae 1 to 25:

A includes at least one of Ni, Co, and Mn,

X includes at least one of a rare earth element, Al, Ni, Co, Mn, Cr, Fe, Mg, Sr, and V, D includes at least one of O, F, S, and P, E includes at least one of Co and Mn, M includes at least one of F, S, and P, G includes at least one of Al, Cr, Mn, Fe, Mg, La, Ce, Sr, and V, Q includes at least one of Ti, Mo, and Mn, Z includes at least one of Cr, V, Fe, Sc, and Y, and J includes at least one of V, Cr, Mn, Co, Ni, and Cu.

At least one of the above and other features and/or advantages may also be realized by providing a positive electrode for a rechargeable battery including a current collector, and a positive active material layer including a positive active material and a surface-modified metal oxide.

The surface-modified metal oxide may include an $MR_x$ functional group on its surface and M is Si, Ti, Zr, or Mg, R is a $C_1$-$C_3$ alkyl, and x is 1 to 4.

The surface-modified metal oxide may include, at a center region thereof, at least one of $SiO_2$, $ZrO_2$, $TiO_2$, and MgO.

The surface-modified metal oxide may include $Si(CH_3)_3$ at it surface and $SiO_2$ at the center region thereof.

The surface-modified metal oxide may be included in the positive active material layer in an amount of about 1 to about 10 wt % based on the weight of the positive active material.

The surface-modified metal oxide may be included in the positive active material layer in an amount of about 1 to about 5 wt % based on the weight of the positive active material.

The positive active material may include at least one compound represented by the following Formulae 1 to 25:

$$Li_a A_{1-b} X_b D_2 \quad (1)$$

wherein $0.95 \leq a \leq 1.1$ and $0 \leq b \leq 0.5$ $$Li_a E_{1-b} X_b O_{2-c} M_c \quad (2),$$

wherein $0.95 \leq a \leq 1.1$, $0 \leq b \leq 0.5$, and $0 \leq c \leq 0.05$ $$LiE_{2-b} X_b O_{4-c} M_c \quad (3),$$

wherein $0 \leq b \leq 0.5$ and $0 \leq c \leq 0.05$ $$Li_a Ni_{1-b-c} Co_b X_c D_\alpha \quad (4),$$

wherein $0.95 \leq a \leq 1.1$, $0 \leq b \leq 0.5$, $0 \leq c \leq 0.05$, and $0 < \alpha \leq 2$ $$Li_a Ni_{1-b-c} Co_b X_c O_{2-\alpha} M_\alpha \quad (5),$$

wherein $0.95 \leq a \leq 1.1$, $0 \leq b \leq 0.5$, $0 \leq c \leq 0.05$, and $0 < \alpha < 2$ $$Li_a Ni_{1-b-c} Co_b X_c O_{2-\alpha} M_2 \quad (6),$$

wherein $0.95 \leq a \leq 1.1$, $0 \leq b \leq 0.5$, $0 \leq c \leq 0.05$, and $0 < \alpha < 2$ $$Li_a Ni_{1-b-c} Mn_b X_c D_\alpha \quad (7),$$

wherein $0.95 \leq a \leq 1.1$, $0 \leq b \leq 0.5$, $0 \leq c \leq 0.05$, and $0 < \alpha \leq 2$ $$Li_a Ni_{1-b-c} Mn_b X_c O_{2-\alpha} M_\alpha \quad (8),$$

wherein $0.95 \leq a \leq 1.1$, $0 \leq b \leq 0.5$, $0 \leq c \leq 0.05$, and $0 < \alpha < 2$ $$Li_a Ni_{1-b-c} Mn_b X_c O_{2-\alpha} M_2 \quad (9),$$

wherein $0.95 \leq a \leq 1.1$, $0 \leq b \leq 0.5$, $0 \leq c \leq 0.05$, and $0 < \alpha < 2$ $$Li_a Ni_b E_c G_d O_2 \quad (10),$$

wherein $0.90 \leq a \leq 1.1$, $0 \leq b \leq 0.9$, $0 \leq c \leq 0.5$, and $0.001 \leq d \leq 0.1$ $$Li_a Ni_b Co_c Mn_d G_e O_2 \quad (11),$$

wherein $0.90 \leq a \leq 1.1$, $0 \leq b \leq 0.9$, $0 \leq c \leq 0.5$, $0 \leq d \leq 0.5$, and $0.001 \leq e \leq 0.1$ $$Li_a Ni G_b O_2 \quad (12),$$

wherein $0.90 \leq a \leq 1.1$ and $0.001 \leq b \leq 0.1$ $$Li_a Co G_b O_2 \quad (13),$$

wherein $0.90 \leq a \leq 1.1$ and $0.001 \leq b \leq 0.1$ $$Li_a Mn G_b O_2 \quad (14),$$

wherein $0.90 \leq a \leq 1.1$ and $0.001 \leq b \leq 0.1$ $$Li_a Mn_2 G_b O_4 \quad (15),$$

wherein $0.90 \leq a \leq 1.1$ and $0.001 \leq b \leq 0.1$ $$QO_2 \quad (16),$$

$$QS_2 \quad (17),$$

$$LiQS_2 \quad (18),$$

$$V_2O_5 \quad (19),$$

$$LiV_2O_5 \quad (20),$$

$$LiZO_2 \quad (21),$$

$$LiNiVO_4 \quad (22),$$

$$Li_{(3-f)} J_2 (PO_4)_3 \quad (23),$$

wherein $0 \leq f \leq 2$ $$Li_{(3-f)} Fe_2 (PO_4)_3 \quad (24),$$

wherein $0 \leq f \leq 2$ $$LiFePO_4 \quad (25)$$

wherein, in Formulae 1 to 25:

A includes at least one of Ni, Co, and Mn,

X includes at least one of a rare earth element, Al, Ni, Co, Mn, Cr, Fe, Mg, Sr, and V, D includes at least one of O, F, S, and P, E includes at least one of Co and Mn, M includes at least one of F, S, and P, G includes at least one of Al, Cr, Mn, Fe, Mg, La, Ce, Sr, and V, Q includes at least one of Ti, Mo, and Mn, Z includes at least one of Cr, V, Fe, Sc, and Y, and J includes at least one of V, Cr, Mn, Co, Ni, and Cu At least one of the above and other features and/or advantages may also be realized by providing a rechargeable battery including a positive electrode including a current collector and a positive active material layer including a positive active material and a surface-modified metal oxide, a negative electrode including a negative active material, and a non-aqueous electrolyte.

The surface-modified metal oxide may include an $MR_x$ functional group on its surface, and M is Si, Ti, Zr, or Mg, R is a $C_1$-$C_3$ alkyl, and x is 1 to 4.

The surface-modified metal oxide may include, at a center region thereof, at least one of $SiO_2$, $ZrO_2$, $TiO_2$, and MgO.

The surface-modified metal oxide may include $Si(CH_3)_3$ at it surface and $SiO_2$ at the center region thereof.

The surface-modified metal oxide may be included in the positive active material layer in an amount of about 1 to about 10 wt % based on the weight of the positive active material.

The surface-modified metal oxide may be included in the positive active material layer in an amount of about 1 to about 5 wt % based on the weight of the positive active material.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION OF THE INVENTION

Figure 1:
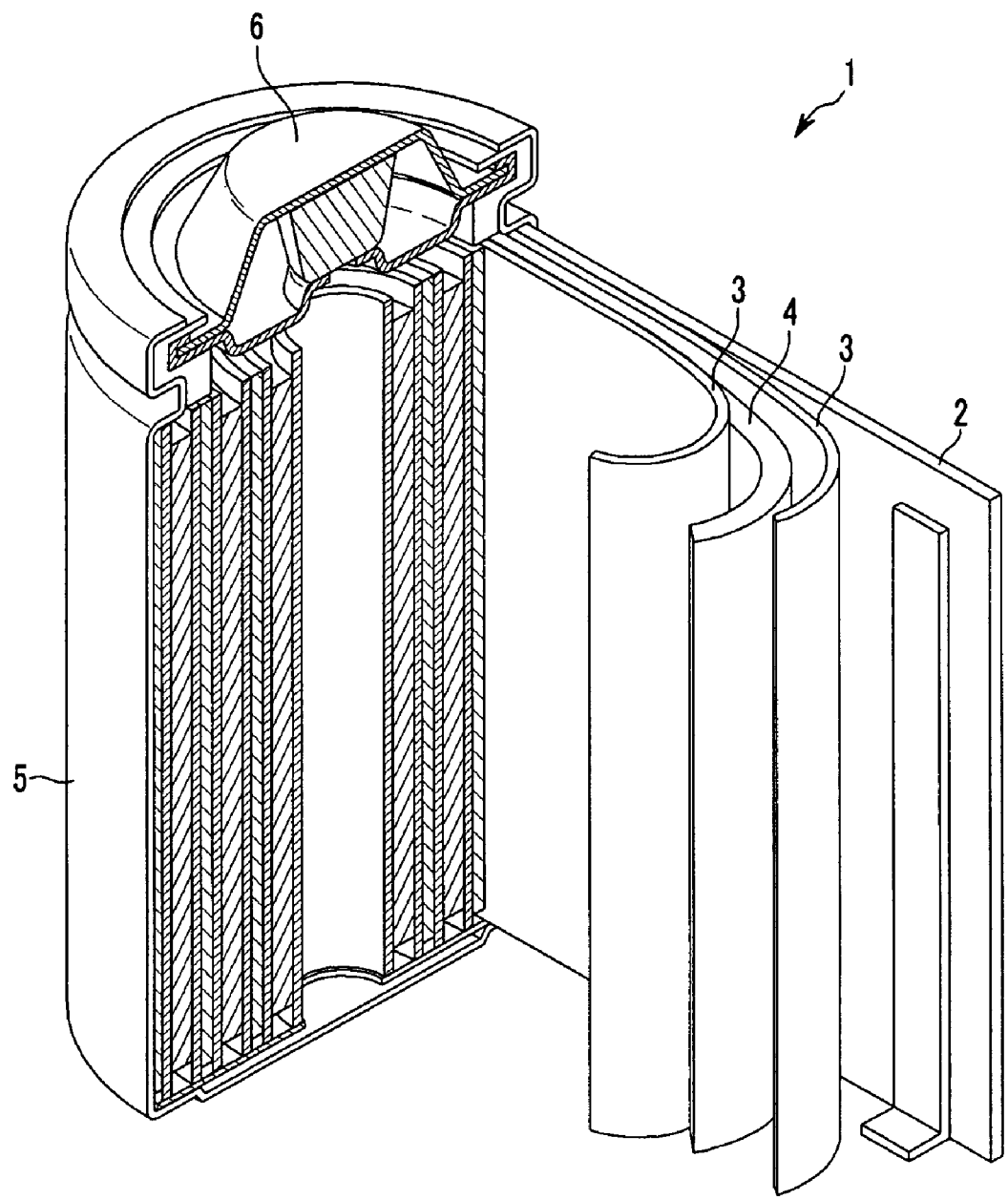
FIG. 1 illustrates a schematic view of a rechargeable battery according to an embodiment.

Korean Patent Application No. 10-2008-0109447, filed on Nov. 5, 2008, in the Korean Intellectual Property Office, and entitled, "Positive Active Material Composition for Rechargeable Lithium Battery, Electrode Fabricated by Using the Same, and Rechargeable Lithium Battery Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "an organic solvent" may represent a single compound, e.g., benzene, or multiple compounds in combination, e.g., benzene mixed with fluorobenzene.

According to an embodiment, a surface-modified metal oxide may be added to a positive active material composition for fabricating a positive electrode. A positive electrode in a rechargeable battery is an electrode that serves as a cathode during cell discharge, the cathode receiving electrons during cell discharge. The positive active material composition according to an embodiment may include a positive active material and the surface-modified metal oxide. The surface-modified metal oxide may include a metal oxide having an $MR_x$ functional group at its surface. In $MR_x$, M may be, e.g., Si, Ti, Zr, or Mg, R may be, e.g., a $C_1$-$C_3$ alkyl. The value of x may be determined according to M. For example, x may be an integer of 1 to 4. When the alkyl group has more than 3 carbons, it may be too bulky and may not attach on the surface of a metal oxide. The metal oxide may include, e.g., $SiO_2$, $ZrO_2$, $TiO_2$, MgO, and mixtures thereof. The metal oxide may be at a center region of the surface-modified metal oxide.

When the surface-modified metal oxide according to an embodiment is mixed with the positive active material, it may bond with a strong acid, e.g., HF derived from a lithium salt in an electrolyte of the battery, during charging and discharging of the battery. Accordingly, the surface-modified metal oxide according to an embodiment may remove the HF and suppress the HF from destroying the surface structure of the positive active material, which would undesirably increase battery resistance. Thus, the surface-modified metal oxide according to an embodiment may improve low temperature power characteristics. In addition, the surface-modified metal oxide may increase tensile strength and heat resistance of the positive active material and suppress its cohesion, improving its dispersion. Further, because the surface-modified metal oxide may have a lower moisture absorption capability than a non-surface-modified metal oxide, it may not absorb moisture and may thereby suppress gas generation inside the battery.

The surface-modified metal oxide may have a high specific surface area, e.g., about 50 to about 600 $m^2$/g. Maintaining the specific surface area within these amounts may help ensure that the surface-modified metal oxide removes HF and provides a composition having an appropriate viscosity, and resultantly, may be effectively mixed with a positive active material. In other words, maintaining the specific surface area at about 50 $m^2$/g or greater may help ensure that the surface modified metal oxide may effectively remove HF. On the other hand, maintaining the specific surface area at about 600 $m^2$/g or less may help ensure that the surface area does not become too large for properly absorbing the solvent and the viscosity does not increase such that it may not be well-mixed with a positive active material. The surface-modified metal oxide may have an absorption peak at about 2900 to about 3000 $cm^{-1}$ of the IR spectrum as a result of the presence of the alkyl group, R, on the surface of the surface-modified metal oxide.

According to an embodiment, the surface-modified metal oxide may be added in an amount of about 1 to about 10 wt % based on the entire weight of the positive active material. Preferably, the surface-modified metal oxide is added in an amount of about 1 to about 5 wt %. Maintaining the amount at about 1 wt % to about 10 wt % based on the entire weight of the positive active material may help prevent fluidity deterioration of the positive active material composition, which may otherwise occur when a material with an unduly large specific surface area is included.

The surface-modified metal oxide may be prepared by a method that modifies the surface of a metal oxide by attaching $MR_x$ thereon. In $MR_x$, M may be, e.g., Si, Ti, Zr, or Mg, R may be, e.g., a $C_1$-$C_3$ alkyl group, and x may be determined according to M. For example, x may be an integer from 1 to 4. Representatively, the surface-modified metal oxide may be prepared by a flame hydrolysis method in which a compound capable of providing $MR_x$ is introduced into a process of preparing, e.g., $SiO_2$, $TiO_2$, $ZrO_2$, and the like, from respective precursors such as $SiCl_4$, $TiCl_4$, $ZrCl_4$, and the like.

According to an embodiment, the positive active material may include, e.g., a lithiated intercalation compound that can reversibly intercalate and deintercalate lithium. The rechargeable battery may be a lithium rechargeable battery. The positive active material may include at least one compound represented by the following Formulae 1 to 25.

$$Li_aA_{1-b}X_bD_2 \quad (1)$$

wherein $0.95 \leq a \leq 1.1$ and $0 \leq b \leq 0.5$ $$Li_aE_{1-b}X_bO_{2-c}M_c \quad (2),$$

wherein $0.95 \leq a \leq 1.1$, $0 \leq b \leq 0.5$, and $0 \leq c \leq 0.05$ $$LiE_{2-b}X_bO_{4-c}M_c \quad (3),$$

wherein $0 \leq b \leq 0.5$ and $0 \leq c \leq 0.05$ $$Li_aNi_{1-b-c}Co_bX_cD_\alpha \quad (4),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Co_bX_cO_{2-\alpha}M_\alpha \quad (5),$$

wherein $0.95 \leq a \leq 1.1$, $0 \leq b \leq 0.5$, $0 \leq c \leq 0.05$, and $0 < \alpha < 2$ $$Li_aNi_{1-b-c}Co_bX_cO_{2-\alpha}M_2 \quad (6),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cD_\alpha \quad (7),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Mn_bX_cO_{2-\alpha}M_\alpha \quad (8),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cO_{2-\alpha}M_2 \quad (9),$$

wherein $0.95 \leq a \leq 1.1$, $0 \leq b \leq 0.5$, $0 \leq c \leq 0.05$, and $0 < \alpha < 2$ $$Li_aNi_bE_cG_dO_2 \quad (10),$$

wherein $0.90 \leq a \leq 1.1$, $0 \leq b \leq 0.9$, $0 \leq c \leq 0.5$, and $0.001 \leq d \leq 0.1$ $$Li_aNi_bCo_cMn_dG_eO_2 \quad (11),$$

wherein $0.90 \leq a \leq 1.1$, $0 \leq b \leq 0.9$, $0 \leq c \leq 0.5$, $0 \leq d \leq 0.5$, and $0.001 \leq e \leq 0.1$ $$Li_aNiG_bO_2 \quad (12),$$

wherein $0.90 \leq a \leq 1.1$ and $0.001 \leq b \leq 0.1$ $$Li_aCoG_bO_2 \quad (13),$$

wherein $0.90 \leq a \leq 1.1$ and $0.001 \leq b \leq 0.1$ $$Li_aMnG_bO_2 \quad (14),$$

wherein $0.90 \leq a \leq 1.1$ and $0.001 \leq b \leq 0.1$ $$Li_aMn_2G_bO_4 \quad (15),$$

wherein $0.90 \leq a \leq 1.1$ and $0.001 \leq b \leq 0.1$ $$QO_2 \quad (16),$$

$$QS_2 \quad (17),$$

$$LiQS_2 \quad (18),$$

$$V_2O_5 \quad (19),$$

$$LiV_2O_5 \quad (20),$$

$$LiZO_2 \quad (21),$$

$$LiNiVO_4 \quad (22),$$

$$Li_{(3-f)}J_2(PO_4)_3 \quad (23),$$

wherein $0 \leq f \leq 2$ $$Li_{(3-f)}Fe_2(PO_4)_3 \quad (24),$$

wherein $0 \leq f \leq 2$ $$LiFePO_4 \quad (25)$$

In Formulae 1 to 25, A may be, e.g., Ni, Co, Mn, and combinations thereof;

In Formulae 1 to 25, X may be, e.g., Al, Ni, Co, Mn, Cr, Fe, Mg, Sr, V, a rare earth element, and combinations thereof;

In Formulae 1 to 25, D may be, e.g., O, F, S, P, and combinations thereof;

In Formulae 1 to 25, E may be, e.g., Co Mn, and combinations thereof;

In Formulae 1 to 25, M may be, e.g., F, S, P, and combinations thereof;

In Formulae 1 to 25, G may be, e.g., Al, Cr, Mn, Fe, Mg, La, Ce, Sr, V, and combinations thereof;

In Formulae 1 to 25, Q may be, e.g., Ti, Mo, Mn, and combinations thereof;

In Formulae 1 to 25, Z may be, e.g., Cr, V, Fe, Sc, Y, and combinations thereof; and In Formulae 1 to 25, J may be, e.g., V, Cr, Mn, Co, Ni, Cu, and combinations thereof.

In Formulae 1 to 9, b may satisfy the relation $0 \leq b \leq 0.45$.

The positive active material preferably includes Ni-rich compounds among the lithiated intercalation compound because of beneficial effects of using the surface-modified metal oxide together therewith. The Ni-rich compound may be represented by Formulae 1 to 3, 10 to 12, and 22 in which A is Ni.

The positive active material may include the positive active material with a coating layer, or a mixture of the active material and a compound with the coating layer. The coating layer may include at least one coating element compound including, e.g., an oxide and a hydroxide of the coating element, an oxyhydroxide of the coating element, an oxycarbonate of the coating element, and a hydroxycarbonate of the coating element. The compound for the coating layer may be amorphous or crystalline. The coating element included in the coating layer may be, e.g., Mg, Al, Co, K, Na, Ca, Si, Ti, V, Sn, Ge, Ga, B, As, Zr, and combinations thereof. The coating process may include any suitable conventional process, e.g., spray coating, dipping, as long as it does not cause any side effects to the properties of the positive active material.

The positive active material composition according to an embodiment may include a binder and a conductive material along with the positive active material and the surface-modified metal oxide. The binder may improve binding properties of the positive active material particles to one another and to a current collector. The binder may include, e.g., polyvinylalcohol, carboxylmethyl cellulose, hydroxypropyl cellulose, diacetylene cellulose, polyvinylchloride, carboxylated polyvinylchloride, polyvinylfluoride, an ethylene-oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and so on.

The conductive material may enhance conductivity. Any suitable electrically conductive material may be used unless it causes an undesirable chemical change. The conductive material may include, e.g., natural graphite, artificial graphite, carbon black, acetylene black, ketjen black, carbon fibers, an organic conductive material, metal powder, or metal fibers. The organic conductive material may include, e.g., polyphenylene derivatives. The metal powder or metal fibers may include, e.g., copper, nickel, aluminum, silver, and so on.

The positive active material composition may include a solvent. The solvent may be any suitable solvent being capable of dispersing the positive active material, surface-modified metal oxide, binder, and conductive material. The solvent may include, e.g., acetonitrile, acetone, tetrahydrofuran, dimethylformamide, N-methylpyrrolidone, and so on.

The positive active material composition may be prepared by mixing the positive active material and the surface-modified metal oxide. In addition, at least one of the binder, the conductive material, and the solvent may be mixed with the positive active material and the surface-modified metal oxide.

The positive electrode according to an embodiment may include a positive active material layer formed using the positive active material composition and a current collector supporting the positive active material layer. The positive active material layer may include the positive active material, binder, and conductive material that are physically mixed with the surface-modified metal oxide. The current collector may include a metal, e.g., Al.

The rechargeable battery including the positive electrode may also include a negative electrode including a negative active material, as well as a non-aqueous electrolyte. The negative electrode may include a current collector and a negative active material layer disposed on the current collector, and the negative active material layer may include the negative active material.

The negative active material may include, e.g., a material that reversibly intercalates/deintercalates lithium ions, a lithium metal, a lithium metal alloy, a material that dopes and dedopes on lithium or that reversibly forms a compound with lithium, and a transition element oxide. The lithium metal alloy may include, e.g., Al, Mg, K, Na, Ca, Sr, Ba, Si, Ge, Sb, Pb, In, Rb, Cs, Fr, Be, Ra, Sn, and Zn.

The transition element oxide and the material that dopes and dedopes on lithium or that reversibly intercalates/deintercalates lithium ions may include, e.g., $SnO_2$, vanadium oxide, lithium vanadium oxide, Si, $SiO_x$ ($0<x<2$), a Si—Y alloy (Y may be an element other than Si such as, e.g., an alkali metal, an alkaline-earth metal, an element belonging to Group 13, an element belonging to Group 14, a transition element, a rare earth element, and a combination thereof), Sn, $SnO_2$, Sn—Y alloy (Y may be an element other than Sn such as, e.g., an alkali metal, an alkaline-earth metal, an element belonging to Group 13, an element belonging to Group 14, a transition element, a rare earth element, and a combination thereof), titanium nitrate, and the like. In addition, $SiO_2$ may be mixed with at least one thereof. The element Y may be, e.g., Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, or Po. Combinations thereof may also be used.

The carbon material that may reversibly intercalate/deintercalate lithium ions may include a carbon-based negative active material that is generally used in a lithium ion secondary battery. For example, it may include crystalline carbon, amorphous carbon, or a combination thereof. The crystalline carbon may include graphite, e.g., shapeless, plate-shape, flake, spherical shape, or fiber-type natural graphite or artificial graphite. The amorphous carbon may include, e.g., soft carbon (carbon fired at a low temperature) or hard carbon, mesophase pitch carbide, fired coke, and the like.

The negative active material layer may include, e.g., a binder and a conductive material. The binder may improve binding properties of negative active material particles to themselves and to the current collector. The binder may include, e.g., polyvinylalcohol, carboxylmethyl cellulose, hydroxypropyl cellulose, polyvinylchloride, carboxylated polyvinylchloride, polyvinyldifluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and so on.

The conductive material may enhance conductivity. Any suitable electrically conductive material may be used unless it causes an undesirable chemical change. The conductive material may include, e.g., natural graphite, artificial graphite, carbon black, acetylene black, ketjen black, carbon fibers, an organic conductive material, metal powder, or metal fibers. The organic conductive material may include, e.g., polyphenylene derivatives. The metal fibers and metal powder may include, e.g., copper, nickel, aluminum, silver, and so on.

The current collector may include one or more of, e.g., a copper foil, a nickel foil, a stainless steel foil, a titanium foil, a nickel foam, a copper foam, and a polymer material coated with a conductive metal.

The rechargeable battery may include a non-aqueous electrolyte including, e.g., a non-aqueous organic solvent and a lithium salt. The non-aqueous organic solvent may act as a medium for transmitting ions taking part in the electrochemical reaction of the battery.

The non-aqueous organic solvent may include, e.g., carbonate-based solvent, ester-based solvent, ether-based solvent, ketone-based solvent, alcohol-based solvent, or aprotic solvent. The carbonate-based solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. The ester-based solvent may include, e.g., methyl acetate, ethyl acetate, n-propyl acetate, methylpropionate, ethylpropionate, γ-butyrolactone, decanolide, valerolactone, mevalonolactone, caprolactone, and so on. The ether-based solvent may include, e.g., dibutyl ether, tetraglyme, diglyme, dimethoxyethane, 2-methyltetrahydrofuran, tetrahydrofuran, and so on. The ketone-based solvent may include, e.g., cyclohexanone and so on. The alcohol-based solvent may include, e.g., ethyl alcohol, isopropyl alcohol, and so on. The aprotic solvent may include, e.g., nitriles such as R—CN (wherein R is a C2 to C20 linear, branched, or cyclic hydrocarbon, having a double bond, an aromatic ring, or an ether bond), amides such as dimethylformamide; dioxolanes such as 1,3-dioxolane, sulfolanes, and so on.

The non-aqueous organic solvent may be a single compound or a mixture of compounds. When the organic solvent is a mixture, the mixture ratio may be controlled in accordance with a desired battery performance.

For example, the non-aqueous solvent may be a carbonate-based solvent including a mixture of a cyclic carbonate and a linear carbonate. The cyclic carbonate and the linear carbonate may be mixed together in a volume ratio of about 1:1 to about 1:9, and when the mixture is used as an electrolyte, the electrolyte performance may be enhanced.

In another example, the electrolyte may be a mixture of carbonate-based solvents and aromatic hydrocarbon-based solvents. The carbonate-based solvents and the aromatic hydrocarbon-based solvents are preferably mixed together in a volume ratio of about 1:1 to about 30:1.

The aromatic hydrocarbon-based organic solvent may be represented by the following Formula 26:

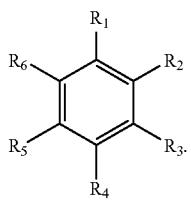

(26)

In Formula 26, $R_1$ to $R_6$ may each independently be a hydrogen, a halogen, a C1 to C10 alkyl, a C1 to C10 haloalkyl.

The aromatic hydrocarbon-based organic solvent may include, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include, e.g., vinylene carbonate or an ethylene-carbonate-based compound of the following Formula 27:

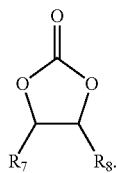

(27)

In Formula 27, $R_7$ and $R_8$ may each independently be a hydrogen, a halogen, a cyano (CN), a nitro ($NO_2$), and a C1 to C5 fluoroalkyl, and at least one of $R_7$ and $R_8$ are a halogen, a cyano (CN), a nitro ($NO_2$), or a C1 to C5 fluoroalkyl.

The ethylene carbonate-based compound may include, e.g., difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be adjusted within an appropriate range.

The lithium salt may supply lithium ions in the battery, and may facilitate a basic operation of a rechargeable battery and may provide lithium ion transport between positive and negative electrodes. The lithium salt may include, e.g., $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalate borate, LiBOB). The lithium salt concentration in the electrolyte may be about 0.1 to about 2.0 M.

Maintaining the lithium salt concentration at about 0.1M or greater may help ensure that electrolyte performance is not deteriorated due to low electrolyte conductivity. Maintaining the lithium salt concentration at about 2.0M or less may help ensure that lithium ion mobility is not reduced due to an increase of electrolyte viscosity.

The rechargeable battery may further include a separator between the negative electrode and the positive electrode, as needed. Suitable separator materials may be electrically non-conductive, i.e., insulators. Suitable separator materials may include, e.g., polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 illustrates a schematic view of a rechargeable battery 1 according to an embodiment. Referring to FIG. 1, the rechargeable battery 1 may include a positive electrode 2 according to an embodiment, a negative electrode 4, a separator 3 interposed between the positive electrode 3 and the negative electrode 2, and an electrolyte (not shown) in which the separator 3 may be immersed. The battery 1 may also include a cell case 5 and a sealing member 6 sealing the cell case 5.

The following examples illustrate the embodiments in more detail. However, it is understood that the embodiments are not limited by these examples.

Example 1

An example surface-modified metal oxide according to an embodiment was prepared by flame hydrolysis of $SiCl_4$. As the $SiCl_4$ was hydrolyzed at 1000° C. under a $H_2$ and $O_2$ atmosphere to prepare $SiO_2$, $Si(CH_3)_3Cl$ was introduced thereto. OH groups that were present on the surface of the $SiO_2$ were removed and $Si(CH_3)_3$ was bonded to the surface of the $SiO_2$, thereby preparing $SiO_2$ having $Si(CH_3)_3$ bonded to the surface via oxygen, i.e., —O—$Si(CH_3)_3$, as the surface-modified metal oxide.

Figure 2:
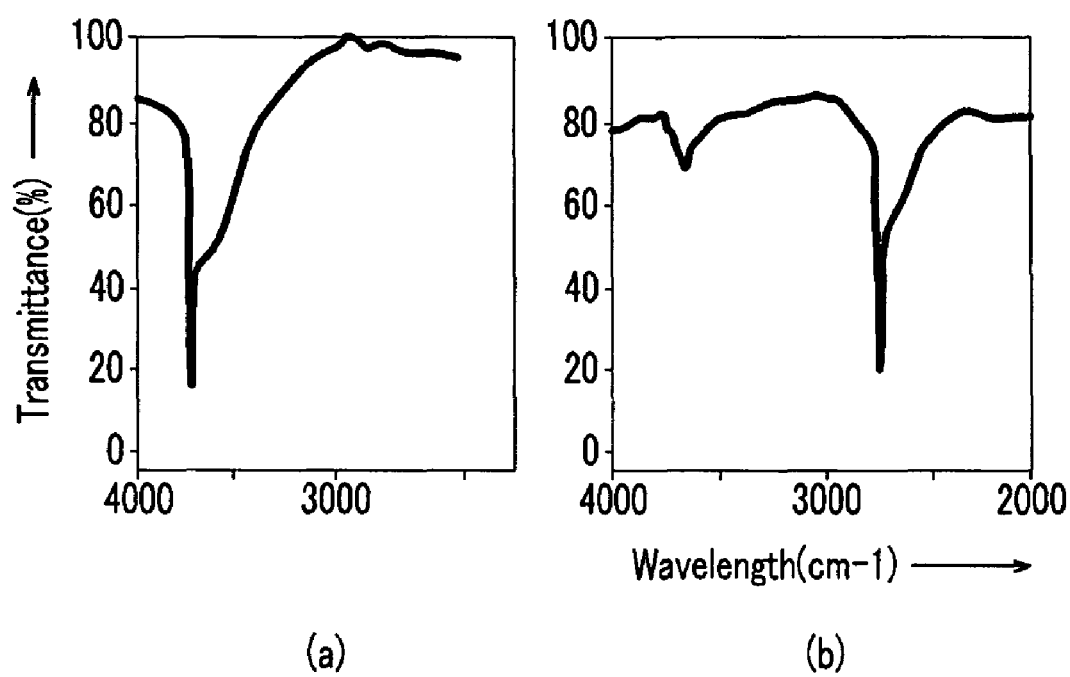
FIGS. 2(a) and 2(b) illustrate graphs showing IR spectra of an unmodified $SiO_2$ and a surface-modified $SiO_2$ according to Example 1, respectively.

The surface-modified metal oxide had a specific surface area of 300 $m^2$/g. Unmodified $SiO_2$ and the surface-modified metal oxide were measured for their IR spectra. The IR spectra are respectively illustrated in (a) and (b) of FIG. 2. Referring to FIG. 2(a), an absorption peak at about 3800 $cm^{-1}$ indicates an OH group, showing that there was OH on the surface of the unmodified $SiO_2$. Referring to FIG. 2(b), there is a $CH_3$ peak at about 2800 $cm^{-1}$, showing that $CH_3$ existed on the surface of the surface-modified metal oxide.

Then, the surface-modified metal oxide, a conductive material (Super-P conductive carbon black from TIMCAL Graphite & Carbon), and a $LiNi_{0.8}Co_{0.15}Al_{0.05}O_2$ positive active material were added to a solution prepared by dissolving a polyvinylidene fluoride binder in an N-methylpyrrolidone solvent, thus preparing an example positive active material composition according to an embodiment.

The amount of surface-modified metal oxide was 2 wt % based on the weight of the positive active material. The $LiNi_{0.8}Co_{0.15}Al_{0.05}O_2$ positive active material, the surface-modified metal oxide, the binder, and the conductive material were mixed in a weight ratio of 82.8:1.7:7:8.5.

The positive active material composition was coated as a slurry on an Al foil using a doctor blade method. The Al foil coated with the positive active material slurry composition was dried in a 120° C. oven for 3 hours and pressed, thus preparing a positive electrode for a coin-type battery. The positive electrode was used together with a Li-metal counter electrode and an electrolyte including a 1M $LiPF_6$ solution in an organic solvent of ethylene carbonate and dimethyl carbonate mixed in a volume ratio of 1:1, thus fabricating a coin-type half-cell.

Example 2

A coin-type half-cell was fabricated according to the same method as Example 1 except for changing the amount of surface-modified metal oxide to 0.5 wt % based on the weight of the positive active material.

Comparative Example 1

A positive active material composition was prepared by mixing a $LiNi_{0.8}Co_{0.15}Al_{0.05}O_2$ positive active material and a conductive material (Super P conductive carbon black from TIMCAL Carbon & Graphite) with a solution prepared by dissolving a polyvinylidene fluoride binder in an N-methylpyrrolidone solvent. The $LiNi_{0.8}Co_{0.15}Al_{0.05}O_2$ positive active material, the binder, and the conductive material, were mixed in a weight ratio of 84.5:7:8.5.

The positive active material composition was coated as a slurry on an Al foil using a doctor blade method. The Al foil coated with the positive active material slurry composition was dried in a 120° C. oven for 3 hours and pressed, thus preparing a positive electrode for a coin-type battery. The positive electrode was used together with a Li-metal counter electrode and an electrolyte including a 1M $LiPF_6$ solution in an organic solvent of ethylene carbonate and dimethyl carbonate mixed in a volume ratio of 1:1, thus fabricating a coin-type half-cell.

Comparative Example 2

The positive active material composition of Comparative Example 1 was coated as a slurry on an Al foil using a doctor blade method to form a positive active material layer. Another coating composition prepared by mixing $SiO_2$ having $Si(CH_3)_3$ bonded to the surface (made as described in Example 1), a polyvinylidene fluoride-hexafluoropropylene binder, and a cyclohexanone solvent in a weight ratio of 3.8:4.6:91.6 was coated to form a layer of $SiO_2$ having $Si(CH_3)_3$ bonded to the surface on the positive active material layer, thus preparing a positive electrode.

The positive electrode was used together with a Li-metal counter electrode and an electrolyte including a 1M $LiPF_6$ solution in an organic solvent of ethylene carbonate and dimethyl carbonate in a volume ratio of 1:1, thus fabricating a coin-type half-cell.

DC Internal Resistance at a Room Temperature

Figure 3:
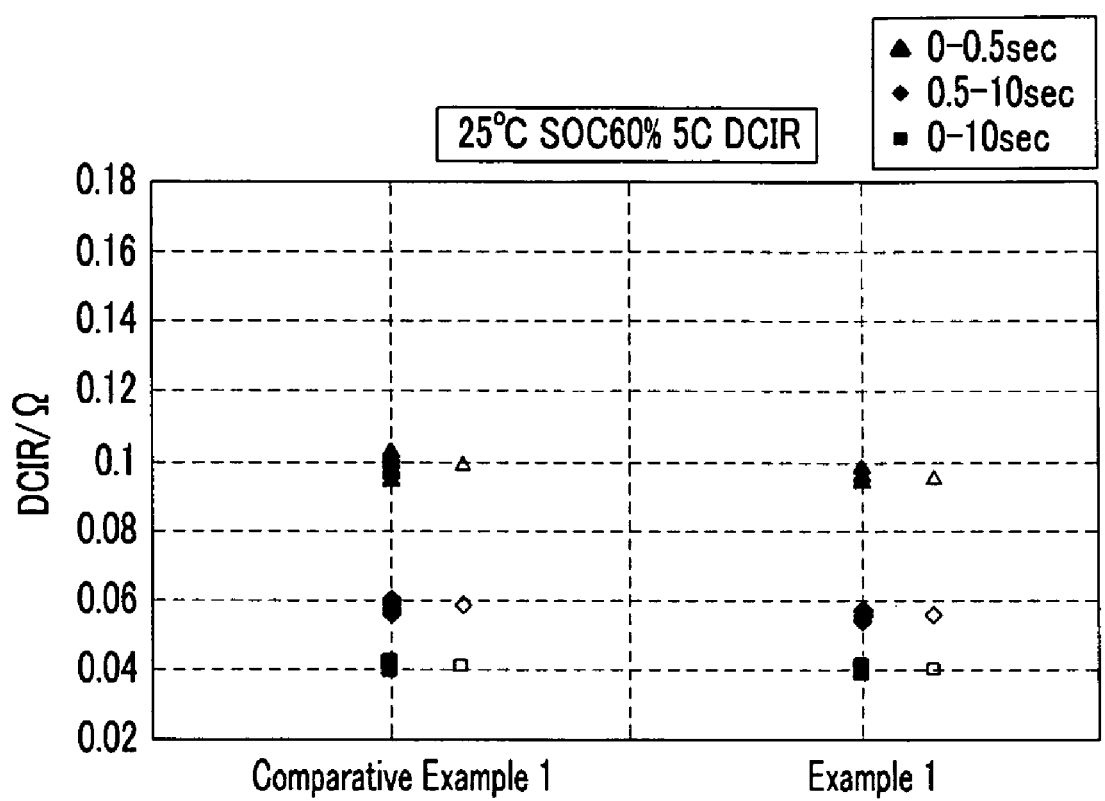
FIG. 3 illustrates a graph showing direct current internal resistance (DCIR) of the battery cells according to Example 1 and Comparative Example 1 at room temperature.

The batteries of Example 1 and Comparative Example 1 were measured regarding direct current internal resistance (DCIR) at a room temperature. The results are illustrated in FIG. 3. The DCIR was measured by respectively fabricating three batteries according to Example 1 and six batteries according to Comparative Example 1, and then discharging them at 5 coulombs (C) for 10 seconds. The results are shown as ▲. Their average is given as △. Referring to FIG. 3, SOC 60% indicates that the batteries were charged up to 60% charge capacity when their entire charge capacity was 100%. In addition, the measurement result for 0-10 seconds was divided into two sections of 0-0.5 seconds (♦, average: ◊) and 0.5-10 seconds (■, average: □). As shown in FIG. 3, the batteries of Example 1 had 5% decreased DCIR at room temperature compared with the ones of Comparative Example 1.

DC Internal Resistance at a Low Temperature of −30° C.

Figure 4:
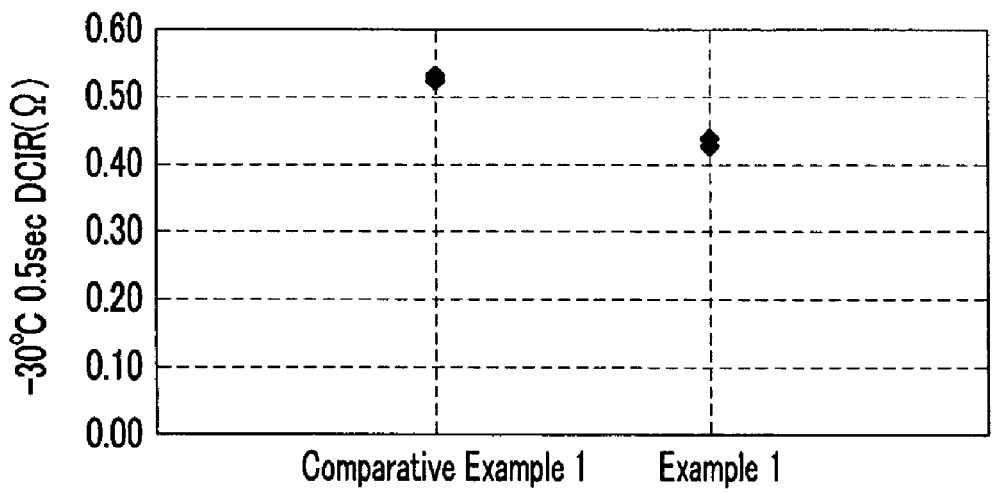
FIG. 4 illustrates a graph showing direct current internal resistance (DCIR) of the battery cells according to Example 1 and Comparative Example 1 at a low temperature.

The batteries of Example 1 and Comparative Example 1 were measured regarding direct current internal resistance (DCIR) at a low temperature (−30° C.). The results are illustrated in FIG. 4. The DC internal resistance was measured by discharging the batteries at 5 C for 0.5 seconds. The same experiment was repeated twice. As shown in FIG. 4, the batteries of Example 1 had more than 20% decreased DC internal resistance at a low temperature than the ones of Comparative Example 1. Therefore, the batteries of Example 1 exhibited better low temperature characteristics than the ones of Comparative Example 1.

DC Internal Resistance According to $SiO_2$ Coating Layer

Figure 5:
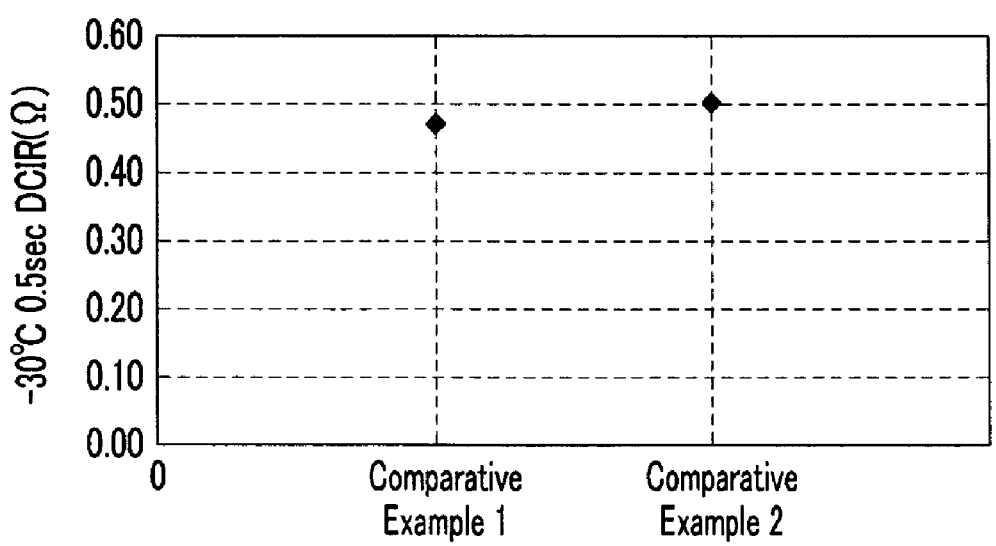
FIG. 5 illustrates a graph showing direct current internal resistance (DCIR) of the battery cells according to Comparative Examples 1 and 2 at a low temperature.

The batteries of Comparative Examples 1 and 2 were measured regarding direct current internal resistance (DCIR) at a low temperature (−30° C.). The results are illustrated in FIG. 5. The DC internal resistance was measured by discharging the batteries at 5 C for 0.5 seconds. As shown in FIG. 5, the batteries of Comparative Example 2 had an increased DC internal resistance compared with the batteries of Comparative Example 1. Thus, it is apparent that, when surface-modified $SiO_2$ was coated as a separate layer on an active material layer, rather than mixed in an active material composition, it could have negative influences on battery characteristics.

The surface-modified metal oxide may be effective when it is added to the positive active material composition used to prepare the positive electrode. However, as described above, when the surface-modified metal oxide is merely coated on the positive electrode active layer (formed by coating the positive active material composition on the current collector), it may not have the same beneficial effects. For example, when the surface-modified metal oxide layer is formed on the positive active material layer, it may undesirably increase resistance and thereby have a negative influence on battery power.

DC Internal Resistance According to the Amount of $SiO_2$

Figure 6:
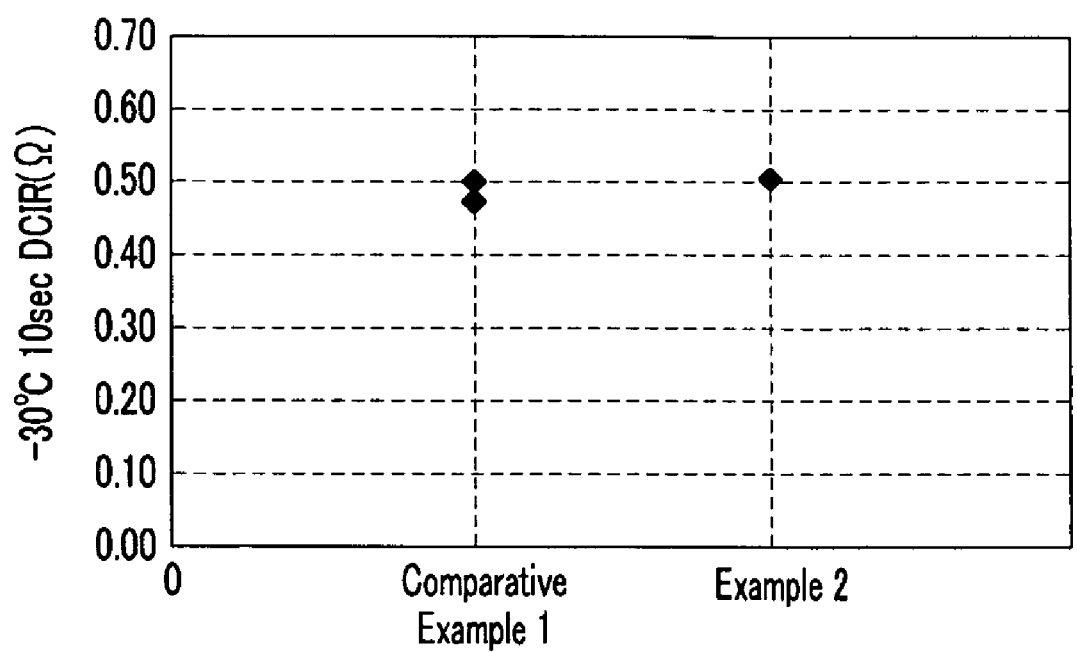
FIG. 6 illustrates a graph showing direct current internal resistance (DCIR) of the battery cells according to Example 2 and Comparative Example 1 at a low temperature.

The batteries of Comparative Example 1 and Example 2 were measured regarding direct current internal resistance (DCIR) at a low temperature (−30° C.). The results are illustrated in FIG. 6. According to Comparative Example 1, two batteries were fabricated, and the same experiment was repeated twice. The DC internal resistance was measured by discharging the batteries at 5 C for 0.5 seconds. As shown in FIG. 6, the batteries of Example 2 had similar DC internal resistance results to the ones of Comparative Example 1. Accordingly, maintaining the amount of the surface-modified metal oxide at greater than about 0.5 wt % based on the weight of the positive active material, and mixing it in the active material composition, may help ensure that it enhances battery characteristics.

Typical positive active materials may have high pH and thus may produce a material, e.g., LiOH, $Li_2CO_3$, and so on, during the electrochemical reaction. These materials may absorb moisture, and the absorbed moisture may react with salts, e.g., $LiPF_6$, of an electrolyte solution and produce HF gas, which may destroy a surface structure of the positive active materials and undesirably increase battery resistance. In contrast, a positive active material composition according to an embodiment may include a positive active material that suppresses the activity of acids such as HF, thus enhancing battery characteristics.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A positive active material composition for a rechargeable battery, comprising:
a positive active material; and
a surface-modified metal oxide, the surface-modified metal oxide including an $MR_x$ functional group at its surface, wherein M is Si, Ti, Zr, or Mg, R is a $C_1$-$C_3$ alkyl, and x is 1 to 4.

2. The positive active material composition as claimed in claim 1, wherein the surface-modified metal oxide includes, at a center region thereof, at least one of $SiO_2$, $ZrO_2$, $TiO_2$, and MgO.

3. The positive active material composition as claimed in claim 2, wherein the surface-modified metal oxide includes $Si(CH_3)_3$ at its surface and $SiO_2$ at the center region thereof.

4. The positive active material composition as claimed in claim 1, wherein the surface-modified metal oxide is included in an amount of about 1 to about 10 wt % based on the weight of the positive active material.

5. The positive active material composition as claimed in claim 4, wherein the surface-modified metal oxide is included in an amount of about 1 to about 5 wt % based on the weight of the positive active material.

6. The positive active material composition as claimed in claim 1, wherein the positive active material includes at least one compound represented by the following Formulae 1 to 25:

$$Li_aA_{1-b}X_bD_2 \quad (1),$$

wherein $0.95 \leq a \leq 1.1$ and $0 \leq b \leq 0.5$ $$Li_aE_{1-b}X_bO_{2-c}M_c \quad (2),$$

wherein $0.95 \leq a \leq 1.1$, $0 \leq b \leq 0.5$, and $0 \leq c \leq 0.05$ $$LiE_{2-b}X_bO_{4-c}M_c \quad (3),$$

wherein $0 \leq b \leq 0.5$ and $0 \leq c \leq 0.05$ $$Li_aNi_{1-b-c}Co_bX_cD_\alpha \quad (4),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Co_bX_cO_{2-\alpha}M_\alpha \quad (5),$$

wherein $0.95 \leq a \leq 1.1$, $0 \leq b \leq 0.5$, $0 \leq c \leq 0.05$, and $0 < \alpha < 2$ $$Li_aNi_{1-b-c}Co_bX_cO_{2-\alpha}M_2 \quad (6),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cD_\alpha \quad (7),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Mn_bX_cO_{2-\alpha}M_\alpha \quad (8),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cO_{2-\alpha}M_2 \quad (9),$$

wherein $0.95 \leq a \leq 1.1$, $0 \leq b \leq 0.5$, $0 \leq c \leq 0.05$, and $0 < \alpha < 2$ $$Li_aNi_bE_cG_dO_2 \quad (10),$$

wherein $0.90 \leq a \leq 1.1$, $0 \leq b \leq 0.9$, $0 \leq c \leq 0.5$, and $0.001 \leq d \leq 0.1$ $$Li_aNi_bCo_cMn_dG_eO_2 \quad (11),$$

wherein $0.90 \leq a \leq 1.1$, $0 \leq b \leq 0.9$, $0 \leq c \leq 0.5$, $0 \leq d \leq 0.5$, and $0.001 \leq e \leq 0.1$ $$Li_aNiG_bO_2 \quad (12),$$

wherein $0.90 \leq a \leq 1.1$ and $0.001 \leq b \leq 0.1$ $$Li_aCoG_bO_2 \quad (13),$$

wherein $0.90 \leq a \leq 1.1$ and $0.001 \leq b \leq 0.1$ $$Li_aMnG_bO_2 \quad (14),$$

wherein $0.90 \leq a \leq 1.1$ and $0.001 \leq b \leq 0.1$ $$Li_aMn_2G_bO_4 \quad (15),$$

wherein $0.90 \leq a \leq 1.1$ and $0.001 \leq b \leq 0.1$ $$QO_2 \quad (16),$$

$$QS_2 \quad (17),$$

$$LiQS_2 \quad (18),$$

$$V_2O_5 \quad (19),$$

$$LiV_2O_5 \quad (20),$$

$$LiZO_2 \quad (21),$$

$$LiNiVO_4 \quad (22),$$

$$Li_{(3-f)}J_2(PO_4)_3 \quad (23),$$

wherein $0 \leq f \leq 2$ $$Li_{(3-f)}Fe_2(PO_4)_3 \quad (24),$$

wherein $0 \leq f \leq 2$ $$LiFePO_4 \quad (25)$$

wherein, in Formulae 1 to 25:
A includes at least one of Ni, Co, and Mn,
X includes at least one of a rare earth element, Al, Ni, Co, Mn, Cr, Fe, Mg, Sr, and V,
D includes at least one of O, F, S, and P,
E includes at least one of Co and Mn,
M includes at least one of F, S, and P,
G includes at least one of Al, Cr, Mn, Fe, Mg, La, Ce, Sr, and V,
Q includes at least one of Ti, Mo, and Mn,
Z includes at least one of Cr, V, Fe, Sc, and Y, and
J includes at least one of V, Cr, Mn, Co, Ni, and Cu.

7. A positive electrode for a rechargeable battery, comprising:
a current collector; and
a positive active material layer including a positive active material and a surface-modified metal oxide, the surface-modified metal oxide including an $MR_x$ functional group at its surface, wherein M is Si, Ti, Zr, or Mg, R is a $C_1$-$C_3$ alkyl, and x is 1 to 4.

8. The positive electrode as claimed in claim 7, wherein the surface-modified metal oxide includes, at a center region thereof, at least one of $SiO_2$, $ZrO_2$, $TiO_2$, and MgO.

9. The positive electrode as claimed in claim 8, wherein the surface-modified metal oxide includes $Si(CH_3)_3$ at its surface and $SiO_2$ at the center region thereof.

10. The positive electrode as claimed in claim 7, wherein the surface-modified metal oxide is included in the positive active material layer in an amount of about 1 to about 10 wt % based on the weight of the positive active material.

11. The positive electrode as claimed in claim 10, wherein the surface-modified metal oxide is included in the positive active material layer in an amount of about 1 to about 5 wt % based on the weight of the positive active material.

12. The positive electrode as claimed in claim 7, wherein the positive active material includes at least one compound represented by the following Formulae 1 to 25:

$$Li_aA_{1-b}X_bD_2 \quad (1),$$

wherein $0.95 \leq a \leq 1.1$ and $0 \leq b \leq 0.5$ $$Li_aE_{1-b}X_bO_{2-c}M_c \qquad (2),$$

wherein $0.95 \leq a \leq 1.1$, $0 \leq b \leq 0.5$, and $0 \leq c \leq 0.05$ $$LiE_{2-b}X_bO_{4-c}M_c \qquad (3),$$

wherein $0 \leq b \leq 0.5$ and $0 \leq c \leq 0.05$ $$Li_aNi_{1-b-c}Co_bX_cD_\alpha \qquad (4),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Co_bX_cO_{2-\alpha}M_\alpha \qquad (5),$$

wherein $0.95 \leq a \leq 1.1$, $0 \leq b \leq 0.5$, $0 \leq c \leq 0.05$, and $0 < \alpha < 2$ $$Li_aNi_{1-b-c}Co_bX_cO_{2-\alpha}M_2 \qquad (6),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cD_\alpha \qquad (7),$$

wherein $0.95 \leq a \leq 1.1$, $0 \leq b \leq 0.5$, $0 \leq c \leq 0.05$, and $0 < \alpha \leq 2$ $$Li_aNi_{1-b-c}Mn_bX_cO_{2-\alpha}M_\alpha \qquad (8),$$

wherein $0.95 \leq a \leq 1.1$, $0 \leq b \leq 0.5$, $0 \leq c \leq 0.05$, and $0 < \alpha < 2$ $$Li_aNi_{1-b-c}Mn_bX_cO_{2-\alpha}M_2 \qquad (9),$$

wherein $0.95 \leq a \leq 1.1$, $0 \leq b \leq 0.5$, $0 \leq c \leq 0.05$, and $0 < \alpha < 2$ $$Li_aNi_bE_cG_dO_2 \qquad (10),$$

wherein $0.90 \leq a \leq 1.1$, $0 \leq b \leq 0.9$, $0 \leq c \leq 0.5$, and $0.001 \leq d \leq 0.1$ $$Li_aNi_bCo_cMn_dG_eO_2 \qquad (11),$$

wherein $0.90 \leq a \leq 1.1$, $0 \leq b \leq 0.9$, $0 \leq c \leq 0.5$, $0 \leq d \leq 0.5$, and $0.001 \leq e \leq 0.1$ $$Li_aNiG_bO_2 \qquad (12),$$

wherein $0.90 \leq a \leq 1.1$ and $0.001 \leq b \leq 0.1$ $$Li_aCoG_bO_2 \qquad (13),$$

wherein $0.90 \leq a \leq 1.1$ and $0.001 \leq b \leq 0.1$ $$Li_aMnG_bO_2 \qquad (14),$$

wherein $0.90 \leq a \leq 1.1$ and $0.001 \leq b \leq 0.1$ $$Li_aMn_2G_bO_4 \qquad (15),$$

wherein $0.90 \leq a \leq 1.1$ and $0.001 \leq b \leq 0.1$ $$QO_2 \qquad (16),$$

$$QS_2 \qquad (17),$$

$$LiQS_2 \qquad (18),$$

$$V_2O_5 \qquad (19),$$

$$LiV_2O_5 \qquad (20),$$

$$LiZO_2 \qquad (21),$$

$$LiNiVO_4 \qquad (22),$$

$$Li_{(3-f)}J_2(PO_4)_3 \qquad (23),$$

wherein $0 \leq f \leq 2$ $$Li_{(3-f)}Fe_2(PO_4)_3 \qquad (24),$$

wherein $0 \leq f \leq 2$ $$LiFePO_4 \qquad (25)$$

wherein, in Formulae 1 to 25:
A includes at least one of Ni, Co, and Mn,
X includes at least one of a rare earth element, Al, Ni, Co, Mn, Cr, Fe, Mg, Sr, and V,
D includes at least one of O, F, S, and P,
E includes at least one of Co and Mn,
M includes at least one of F, S, and P,
G includes at least one of Al, Cr, Mn, Fe, Mg, La, Ce, Sr, and V,
Q includes at least one of Ti, Mo, and Mn,
Z includes at least one of Cr, V, Fe, Sc, and Y, and
J includes at least one of V, Cr, Mn, Co, Ni, and Cu.

13. A rechargeable battery, comprising:
a positive electrode including a current collector and a positive active material layer including a positive active material and a surface-modified metal oxide, the surface-modified metal oxide including an $MR_x$ functional group at its surface, wherein M is Si, Ti, Zr, or Mg, R is a $C_1$-$C_3$ alkyl, and x is 1 to 4;
a negative electrode including a negative active material; and
a non-aqueous electrolyte.

14. The rechargeable battery as claimed in claim 13, wherein the surface-modified metal oxide includes, at a center region thereof, at least one of $SiO_2$, $ZrO_2$, $TiO_2$, and MgO.

15. The rechargeable battery as claimed in claim 14, wherein the surface-modified metal oxide includes $Si(CH_3)_3$ at its surface and $SiO_2$ at the center region thereof.

16. The rechargeable battery as claimed in claim 13, wherein the surface-modified metal oxide is included in the positive active material layer in an amount of about 1 to about 10 wt % based on the weight of the positive active material.

17. The rechargeable battery as claimed in claim 16, wherein the surface-modified metal oxide is included in the positive active material layer in an amount of about 1 to about 5 wt % based on the weight of the positive active material.

* * * * *